Nov. 6, 1973 S. W. AMBERG ET AL 3,770,860
METHOD FOR FORMING THIN-WALLED PLASTIC CONTAINER
Original Filed July 18, 1969 12 Sheets-Sheet 1

INVENTORS
STEPHEN W. AMBERG
RALPH G. AMBERG
RODNEY E. LUDDER
BY
Philip M. Rice
+ S. J. Holler
ATTORNEYS

United States Patent Office 3,770,860
Patented Nov. 6, 1973

3,770,860
METHOD FOR FORMING THIN-WALLED PLASTIC CONTAINER
Stephen W. Amberg, St. James, N.Y., Ralph G. Amberg, Monticello, Ind., and Rodney E. Ludder, Glen Head, N.Y., assignors to Owens-Illinois, Inc.
Continuation of abandoned application Ser. No. 842,839, July 18, 1969. This application Mar. 3, 1972, Ser. No. 231,734
Int. Cl. B29c 17/04, 17/07
U.S. Cl. 264—89               5 Claims

ABSTRACT OF THE DISCLOSURE

Method is provided for forming a nestable preform or blank of polystyrene, polyethylene, polypropylene, polyvinyl chloride or the like into a blow molded thin-walled container having one of a variety of shapes and which, generally, is not nestable. Method is utilized so that the nestable preform can be supplied to the end user, namely, the packer, from the manufacturer in a package containing several hundred preforms in stacked, nested relationship. Such preforms are denested and placed individually in a mold having a cavity contoured to the desired configuration of the finished article. Upon heating to the desired temperature, the preform is expanded within the mold into conformity with the molding cavity. In a preferred embodiment, the preform is heated while it is retained on a mandrel by vacuum applied to the mandrel, thereby retaining all portions of the preform snugly against the mandrel during the heating step. After being enclosed within a blow mold, the preform is expanded by blow air introduced through the mandrel. It has been found that such retention, heating and blowing procedures make it possible to apply printing or other decorating indicia to the preform, and the preprinted final container will be commercially satisfactory upon completion of the blowing step.

Thus, it is possible for the packer either (1) to utilize as a container the printed, nestable preform which he purchases from the preform manufacturer or (2) to convert the purchased, printed, nestable preform into a differently shaped, similarly printed, normally non-nestable container.

This is a continuation of application Ser. No. 842,839, filed July 18, 1969, and now abandoned.

BACKGROUND OF THE INVENTION

It has long been known to package cottage cheese and other types of dairy products in nestable tubs having tapering sidewall portions extending upwardly and outwardly from the bottom. The side wall portions of the tubs generally bear printed indicia which can be applied by any desired printing method, such as offset printing or the like. Such tubs are especially desirable from a shipping standpoint because of the fact that they can readily be nested, thereby permitting them to be shipped in nested stacks which occupy a minimum of space, thus keeping shipping costs to a minimum. On the other hand, such tubs have gained relatively little acceptance outside of the dairy industry because most packers desire to have distinctly-shaped containers in which to package their goods and such distinctiveness simply cannot be obtained in any large degree with nestable containers having tapering sidewall portions. Additionally, such tubs are so universally associated with the dairy industry that packers of other goods have been reluctant to adopt them for their packaging operations. Such packers have, as a result, been forced to pay a high shipping penalty because of the fact that the containers in which their goods are packaged cannot be nested during shipment to them from the container manufacturer's plant.

Some packers have solved the problem of high shipping costs by adopting in-plant molding of plastic containers. This solution is generally not satisfactory because of the high capital cost of equipment needed to mold and print plastic containers, the fact that specialized molding and printing personnel are required to operate such equipment, and the fact that such in-plant molding and printing operations are completely different from the packer's primary operation.

The present invention permits a packer to easily, quickly and economically manufacture in his own plant, distinctively-shaped and printed containers which, as finally utilized, are not nestable, while at the same time substantially reducing his costs by purchasing from a plastic molder in nested form preformed, preprinted blanks. The packer simply reshapes the nested and preprinted preform in a blow mold contoured to the desired configuration. Such reforming step can be readily incorporated as a step in the packer's filling line. Thus, the packer becomes a molder in a very simple operation and yet is saved the complexities involved in setting up a complete plastic blow molding and printing operation.

Accordingly, it is an object of the present invention to provide a method for making a finished container by reshaping an initial, printed, nestable container.

It is an additional object of the present invention to provide a method for reshaping nested preforms which can be readily adapted into a packer's filling operation.

A further object of the present invention is to provide a system for filling containers which includes as a step thereof means for reshaping a plastic preform to the desired configuration.

According to one embodiment of the present invention, it is possible to reshape a previously decorated or printed preform into a finished container of the desired configuration and of greater volume without distorting the decoration or printing.

Therefore, it is an additional object of the present invention to provide method for reshaping preprinted plastic preforms into attractive, distinctively-contoured containers.

Under another embodiment of the present invention, it is proposed to refom these preforms directly into a fiberboard sleeve thereby providing a finished container having a double sidewall for reinforcing, which sidewall may also carry the labeling indicia.

Finally, it is an object of the present invention to provide a method for making a new and unique container.

Other objects and advantages of this invention will become readily apparent from the following detailed description taken in conjunction with the annexed sheets of drawings, on which:

Figure 1:
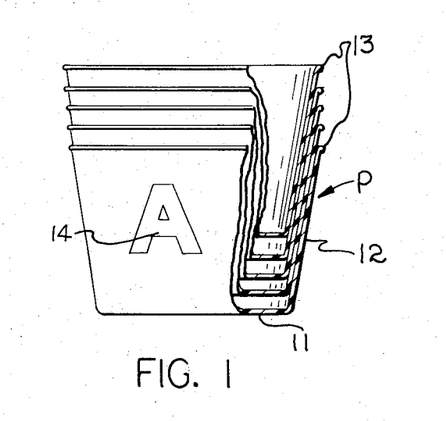
FIG. 1 is an elevational view showing a stack of preforms in nested condition, ready for shipment to a packer.

Referring now to the drawings, there is illustrated in FIG. 1 a plurality of preforms P, each having a bottom portion 11 and a sidewall portion 12 tapering upwardly and outwardly from the bottom portion and terminating in a rim portion 13. The tapering sidewalls permit the preforms P to be stacked in a nested relationship as illustrated. If desired, the preforms can have advertising or other labeling indicia printed on the sidewall thereof as illustrated by the numeral 14.

Figure 2:
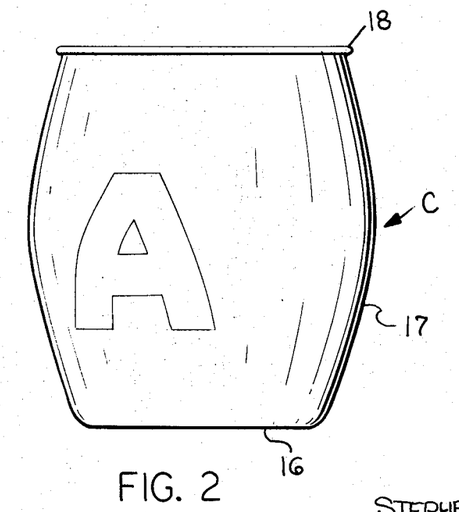
FIG. 2 is an elevational view showing the finished reformed container.

There is illustrated in FIG. 2 a container C which is to be formed by reforming such preform. Such container C has a bottom 16, a sidewall portion 17, and terminates at its upper end in a rim portion 18 defining the periphery of an open mouth. The rim portion 18 of the container C will have substantially the same dimensions and configuration as the rim portion 13 of the preform P. The printing 14 on the container C will have generally the same configuration as the printing on the preform P; however, it obviously will be larger.

The preform P may well, in and of itself, be a container. In fact, such containers are well known in the packaging art and are identified as "tubs" which are normally utilized for the packaging of dairy products, such as cottage cheese, sour cream, margarine, and the like. Such containers may be formed of polystyrene, polyethylene, polypropylene, polyvinyl chloride or the like thermoplastic materials and possess definite advantages, since (1) they can be shipped from a manufacturer to a packager in stacks or nested groups; (2) the tapering sidewalls are adaptable to rapid, inexpensive printing, such as by offset printing, silk screen process, multicolor transfer or hot stamping; and (3) they can be manufactured inexpensively by vacuum forming from sheet material or, if desired, by either blow molding or injection molding. However, to preserve these characteristics, the overall shape and appearance of the containers is quite limited. They simply cannot be made in the wide variety of distinctive, "custom" shapes and configurations which are possible with blow molded containers which are not nestable.

Considering now the blow molded container of FIG. 2, this container can be made in an endless variety of shapes and configurations because of the fact that the body of the container can be made without reference to the size of the rim portion or finish portion 13. The disadvantages of blown containers such as that of FIG. 2 reside in (1) containers of this type are simply not nestable and must be supplied by a manufuacturer to a packer in a manner in which the volume occupied by the container before filling is precisely the same as the volume occupied by the container after filling; (2) the sidewalls 17 of a blow molded, non-nestable container are typically quite irregular and can be printed only by the utilization of hot stamping techniques, or multi-color transfer techniques and (3) the application of decoration to a finished blow molded container is complicated by the fact that the surface being decorated cannot be supported internally by a mandrel or the like.

Obviously, the container C which is to be formed by utilization of the method and apparatus of the present invention is of greater volume and has a greater surface area than does the container of FIG. 1. Thus, the packager, by following the precepts of this invention, after purchasing the preforms P from his supplier now has the option of either using the preform P as the final container or of reforming the preform P into the container C of FIG. 2. If the packer exercises his second option, he need only utilize a very simple blow molding apparatus and method as hereinafter disclosed in detail. The packer need not be concerned about decorating the reformed container C, since this has already been done by the manufacturer of the preform P. Neither must the packager install a complete blow molding arrangement which makes finished containers from pelletized raw material, since this also has already been done by the manufacturer of the preform P. All in all, the packager merely needs to convert the preform from the shape shown in FIG. 1 to the shape shown in FIG. 2 to obtain a distinctive larger volume, printed container.

Figure 3:
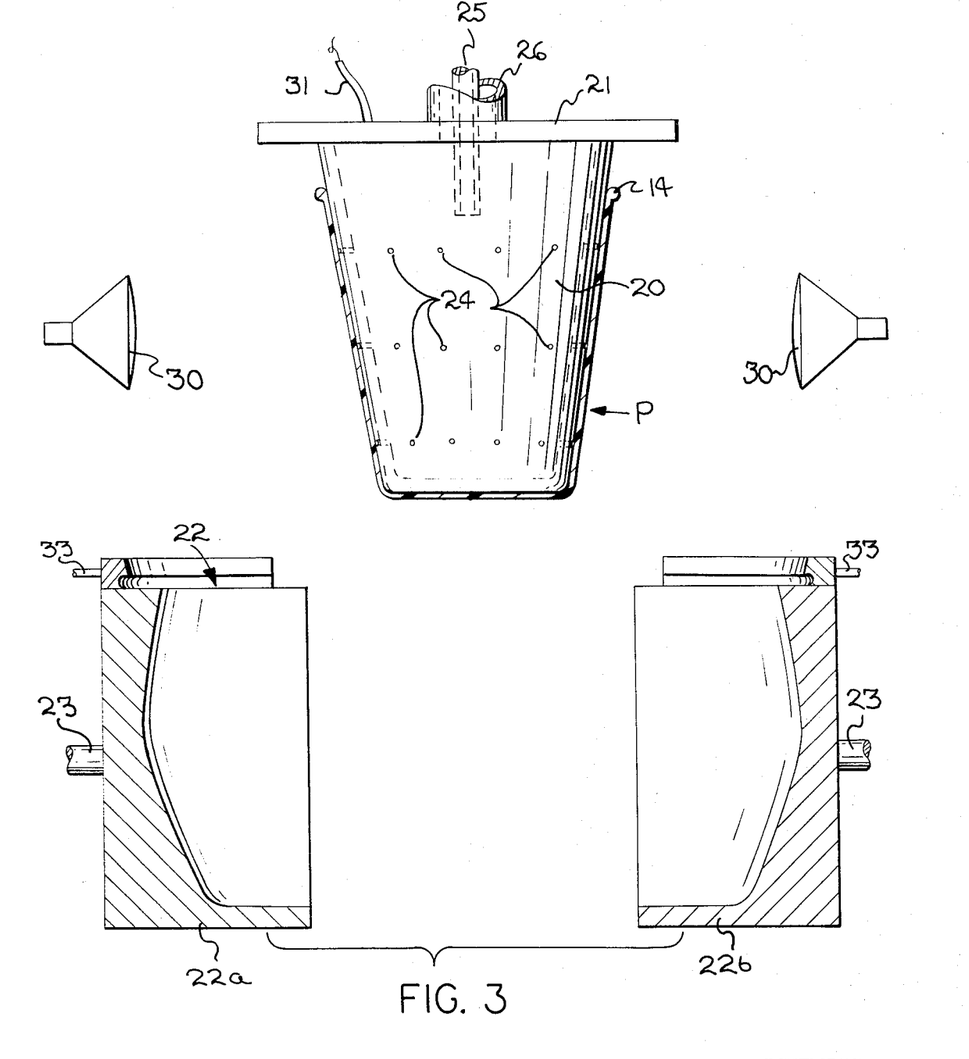
FIGS. 3 through 6 are elevational views showing apparatus for forming containers according to the present invention, and illustrating the sequence of steps involved therein.

Referring now to FIGS. 3 through 6, there is provided a mandrel 20 supported on a platform 21 for movement into and out of a blow mold 22. The blow mold 22 consists of a pair of halves 22a–22b which are mounted for movement between a closed position (FIG. 4) and an open open position (FIG. 3). Any desired means such as fluid pressure cylinders (not shown) having piston rods 23 connected to the respective mold halves 22a–22b may be utilized for moving the mold halves between such closed and opened positions. The mandrel 20 is provided with a plurality of apertures 24 which, during appropriate phases in the cycle, may communicate either with a source of pressured air or with a source of vacuum. To this end, there is provided an air line 25 leading to the mandrel 20 and communicating with the apertures 24. The air line 25 may be connected to any source of pressured air such as an air compressor (not shown). Also connected to the mandrel 20 is a vacuum line 26 which also communicates with the apertures 24. The vacuum line 26 may be connected to a vacuum pump (not shown). Additionally, means are provided to heat the preform to a temperature at which such preform may be readily deformed or blown into conformity with the cavity of the blow mold 22. Such means may include either a source of radiant heat such as infrared lamps 30, or an electrical heater 31 for heating the mandrel 20, or both.

As illustrated in FIGS. 3 through 6, the preform P is initially positioned on the mandrel 20 which is contoured to substantially the same configuration as the interior of the preform. The heating step then commences. As indicated, the heating can be accomplished solely by infrared lamps 30 if desired. However, in order to complete the reforming operation as rapidly as possible, it is desirable to initiate the movement of the mandrel into the blow mold as soon as the preform has been positioned thereon. Accordingly, it is preferred to heat the preform by utilizing a mandrel heated by an electrical heater 31, such as a "Calrod" heater or the like located internally of the mandrel and heating the preform P through heat conducted thereto by the mandrel 20. For polystyrene, it has been found that the preform should be heated to a temperature of about 260°–290° F. prior to blowing.

During movement of the mandrel 20 to the blow mold 22, the preform P may be retained thereon by a pair of rim grippers 32. Upon engagement with the blow mold 22, the rim 13 of the preform P is firmly clamped in position between such rim grippers 32 and the top of the mold 22, thus insuring that the rim portion 14 retains substantially its original configuration during the reforming operation. The rim grippers 32 are actuated to their open (FIG. 3) and their closed (FIG. 4) positions by suitable means, e.g. by separate fluid pressure cylinders (not shown) having actuating rods 33.

Figure 4:
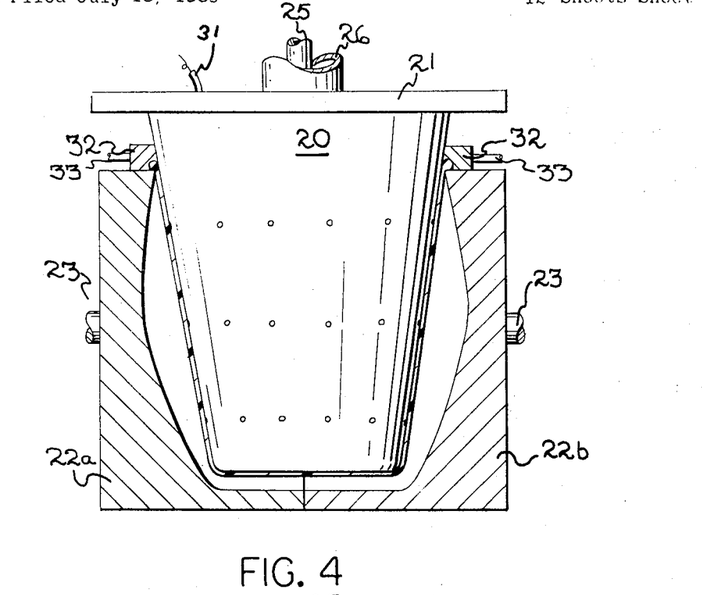

It has been discovered that extreme care must be used in reforming a preform as any sagging or flowing of surface plastic during the heating step causes irregularities, thereby rendering the finished container commercially unacceptable. This is especially true when the preform has been predecorated. The preform must (1) be fully supported during heating and (2) be uniformly inflated during blowing. It has been found that applying a vacuum to the mandrel 20 as through vacuum line 26 during the heating step is very effective in retaining all surface portions of the preform in substantially their original location in preventing surface flow which would impair the quality of the printing. Accordingly, the utilization of such vacuum (which is exerted at a plurality of locations on the preform P by the mandrel apertures 24) permits the reform of predecorated preforms into commercially acceptable decorated containers. The vacuum application step is illustrated in FIG. 4 of the drawings.

Regardless of whether the preform is decorated or undecorated, it is important that it be heated to a substantially uniform temperature throughout prior to is expansion to the final configuration. The reason for this is that the presence of an uneven temperature distribution in closely spaced portions of the preform, for example a "hot spot" in a concentrated area, will result in the hotter portions expanding more readily than adjacent cooler portions upon the introduction of pressured air into the preform. Accordingly, the wall portions of the finished containers will be excessively thin in those areas formed from the "hot spots" and will thus be commercially unacceptable. The utilization of the vacuumizing step during heating aids in obtaining uniform temperature distribution in the preform P, by assuring full and continuous mandrel-preform contact. Additionally, the preform P is heated to a substantially uniform temperature throughout the entire wall thickness of a given area. The metallic mandrel acts as a conduction heater for the entire preform.

Figure 5:
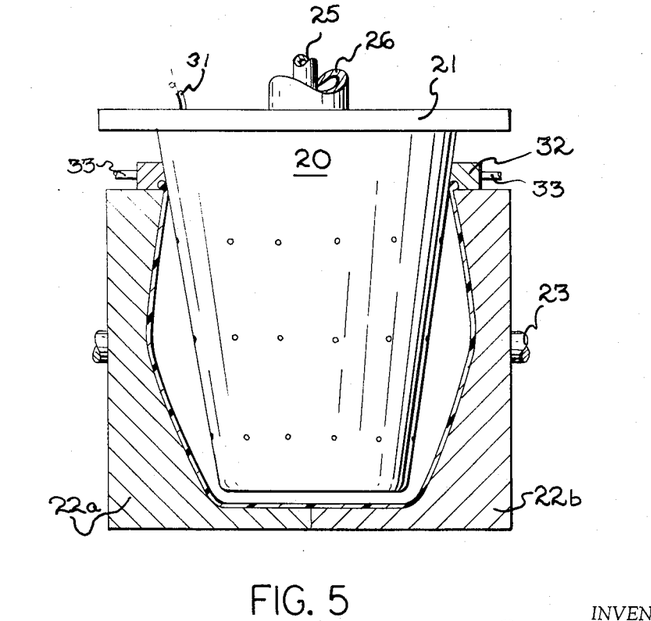
Figure 6:
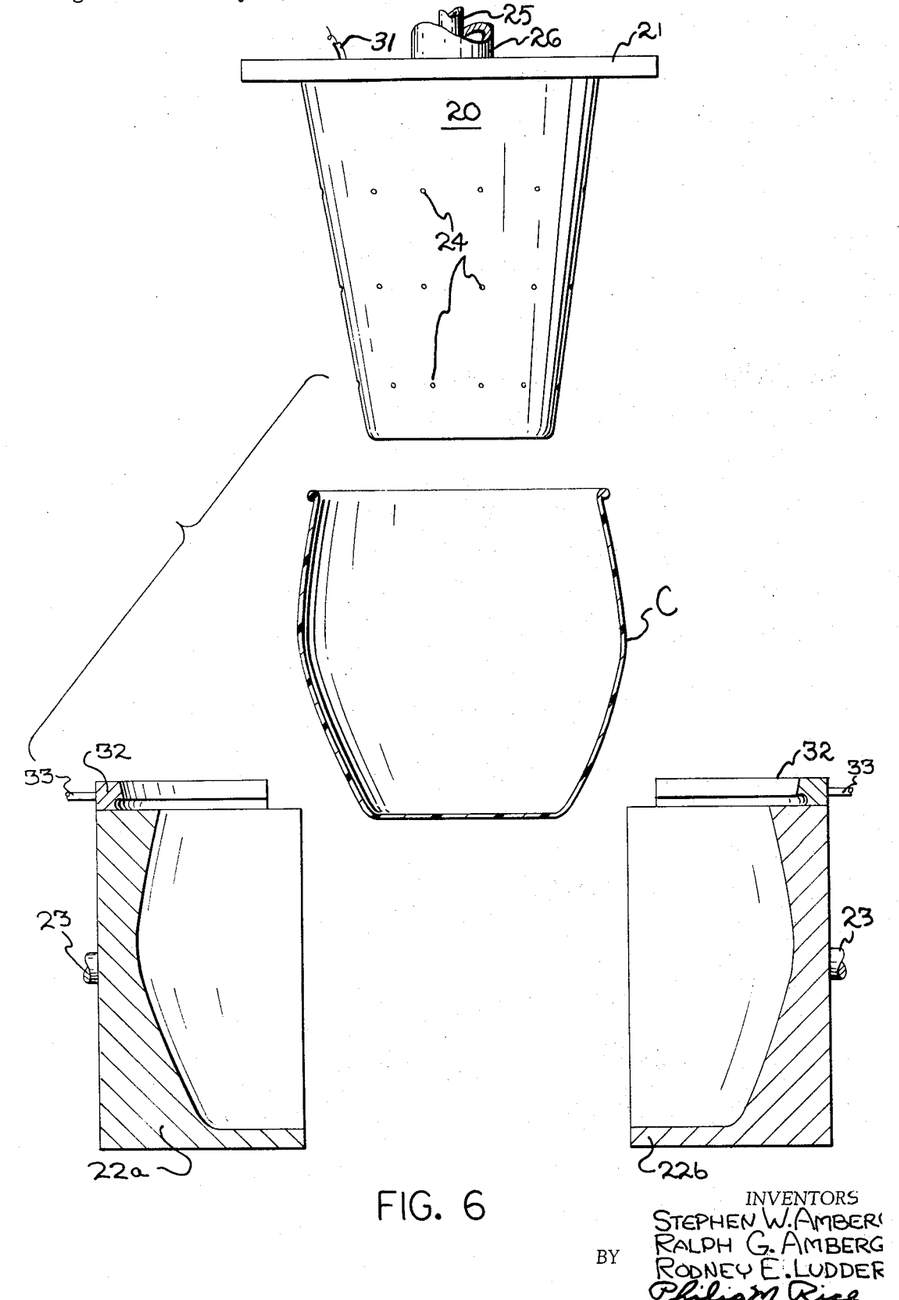

As soon as the preform P is heated to the desired temperature for reshaping, the vacuum is cut off and pressured air is immediately introduced through the air line 25 and the mandrel apertures 24 to expand the preform P into conformity with the molding cavity, hence forming the container C as illustrated in FIG. 5. Thereafter, the mold halves 22a–22b are opened, the mandrel 20 is withdrawn, and the rim grippers 32 are opened, thus completing the reshaping operation. As illustrated in FIG. 6, the finished container C may be blown or otherwise ejected from the mandrel 20.

Figure 7:
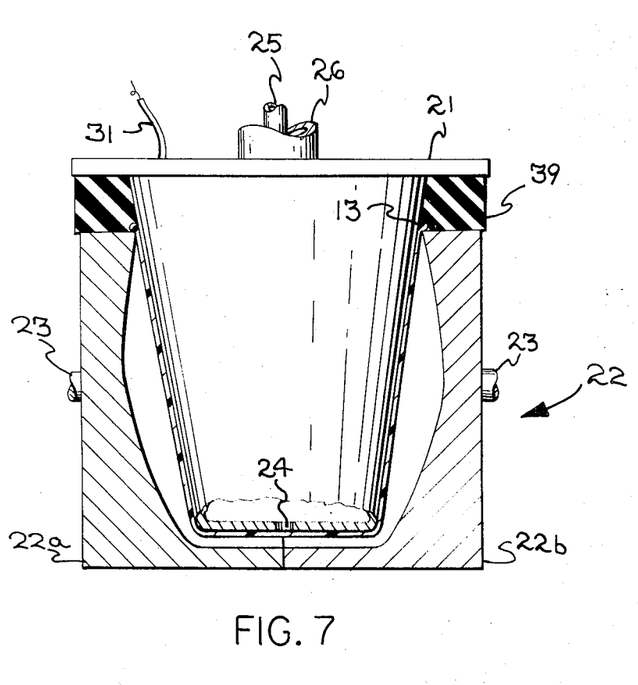
FIG. 7 is a view similar to FIG. 4 showing modified apparatus.

In FIG. 7 there is illustrated a modified embodiment in which the rim grippers 32 of the previous embodiment have been eliminated and replaced with an annular pad 39 formed of rubber or other resilient material. In this embodiment the pad simply clamps the rim 13 of the preform P against the top of the mold 22 to hold it firmly in position during the reforming operation.

Additionally, as can be seen from the drawing, mandrel 20 may be formed without the plurality of apertures 24 in the sidewall portion thereof. As illustrated in FIG. 7, the mandrel 20 may have one or more apertures 24 in the end face thereof through which the vacuum may be exerted from the vacuum line 26 during the heating step and through which pressured air may be introduced through the air line 25 during the blowing step. The locating of the aperture or apertures 24 solely at the free end of the mandrel 20 is advantageous in that any sink marks formed in the preform by the apertures during the vacuumizing step will be confined to the bottom of the container and, hence, not objectionable.

Figure 8:
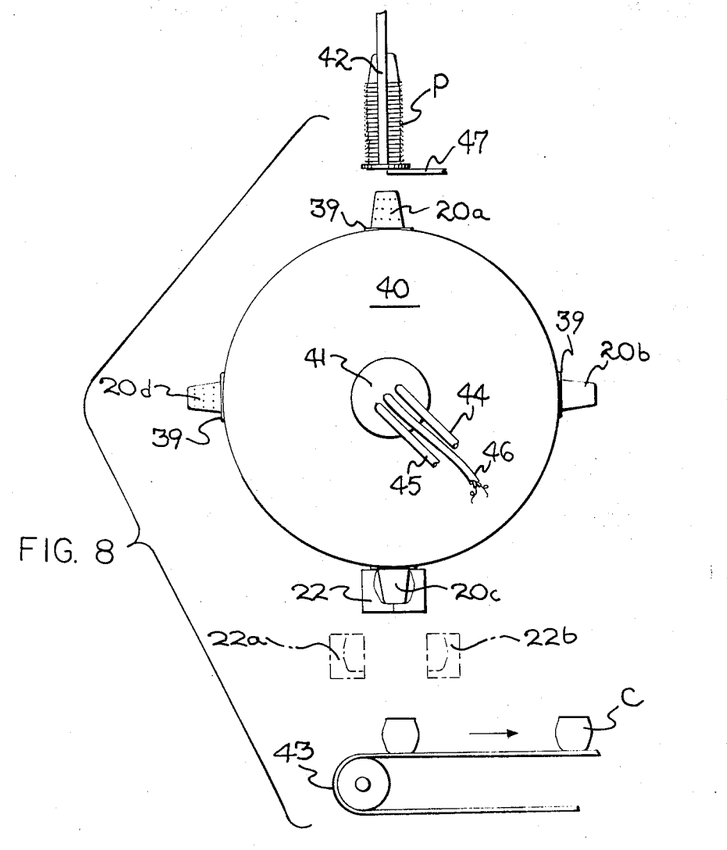
FIG. 8 is a schematic elevational view of equipment for reforming the preforms into finished containers on a production basis.

Referring now to FIG. 8, a different form of apparatus is schematically shown. A drum 40 has a plurality of mandrels 20a, 20b, 20c and 20d extending radially outwardly therefrom, each such mandrel being surrounded by a pad 39 adjacent the drum surface. Suitable drive means are provided for rotating the drum 40 about a horizontal axis on a spindle 41. A feed device 42 containing a stack of nested preforms P is positioned above the drum 40. Latch means 47 are provided for releasing a single preform P from the feed device 42 and permitting such preform P to fall over the mandrel 20 positioned thereunder, 20a as shown in FIG. 8. Blow mold halves 22a–22b are positioned beneath the drum 40 and a conveyor 43 is positioned beneath such blow mold halves. The spindle 41 is hollow and receives therein an air line 44, a vacuum line 45, and heating means 46, each communicating with the respective mandrels 20a, 20b, 20c, 20d and functioning as described heretofore in reference to the embodiments of FIGS. 3 through 7.

In operation, the drum 40 is rotated in a clockwise direction until the mandrel 20a at the upper side of the drum 40 is positioned beneath the feed device 42. The rotation of the drum 40 is then halted and a single preform P fed from the feed device 42 and positioned over the mandrel 20a. The drum 40 is then rotated clockwise 90° from the 12 o'clock position to the 3 o'clock position where the rotation is again halted. During the interval at which the mandrel 20a with the preform P thereon is halted at the 3 o'clock position, the mandrel 20d which is then at the 12 o'clock position beneath the feed device 42 is receiving a preform from the feed device 42. Thereafter, the drum 40 is again rotated 90° to move the mandrel 20a and preform P to the 6 o'clock position which is the blowing station. During the interval between receiving the preform P over the mandrel 20a and the arrival of the preform P and the mandrel 20a at the blowing station, vacuum is applied through line 45 to snugly retain all portions of the preform P against the mandrel and the preform P is heated. Such heating, as noted in the embodiment of FIGS. 3 through 6, can be accomplished by heating the mandrel or by the utilization of an external heat source or by a combination of both. At any rate, upon its arrival at the 6 o'clock position, the previously heated and still hot preform P is ready for expansion upon the introduction of pressured air therein. After the rotation of the drum 40 has been stopped with the hot preform P at the 6 o'clock position, the blow mold halves 22a–22b are moved from a lowered and open position shown in phantom lines in FIG. 8 to a position in alignment with the preform P and the mandrel. Then the mold halves 22a and 22b are closed therearound with the rim 13 clamped between the pad 39 and the top of the mold 22. Thereafter, pressured air is introduced through the line 44 and the apertures 24 to expand the heated preform P into conformity with the cavity of the closed blow mold 22.

The blow mold 22 is then lowered away from the mandrel, carrying with it the completed container C. As soon as the blow mold 22 is out of the path of movement of the mandrel 20a, the drum 40 is again rotated at 90° to move the mandrel 20d and its preform P to the 6 o'clock blow molding position. During such rotation, the newly formed container C is cooled and the mold halves 22a and 22b are opened to permit the container C to drop to the conveyor 43 for movement to a conventional filling station. The blow mold 22 is then again moved into alignment with the mandrel 20d at the 6 o'clock station and the cycle is repeated.

Figure 9:
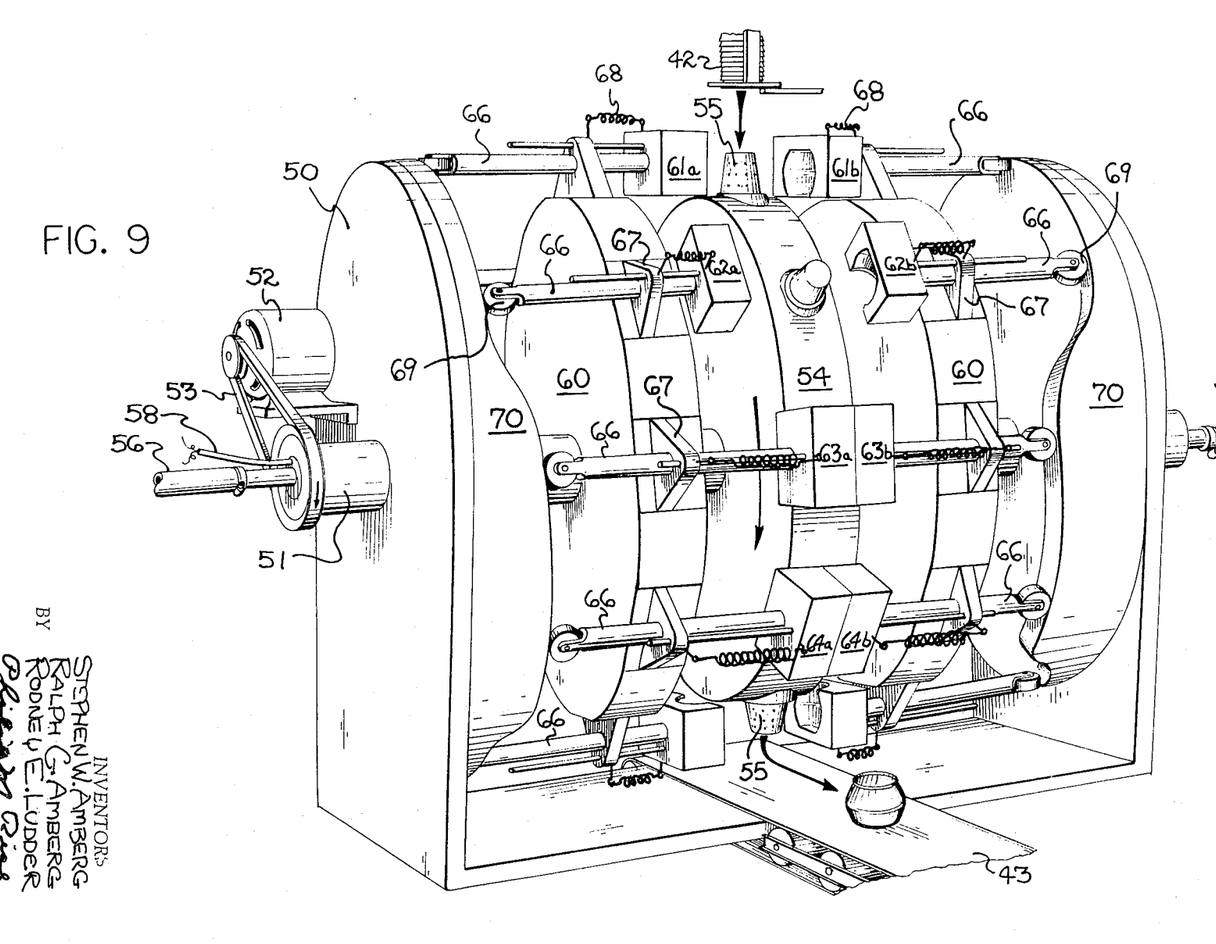
FIG. 9 is a perspective view of another type of apparatus for reforming the preforms on a production basis.

Referring now to FIG. 9, there is schematically illustrated an apparatus for molding containers on a continuous basis rather than an intermittent basis as illustrated in FIG. 8. Such apparatus includes a frame 50 on which is mounted a spindle 51 for rotation about a horizontal axis. Rotation of such spindle 51 is powered by means of an electric motor 52 connected thereto by means of a belt 53.

Carried on the spindle 51 for rotation therewith is a central drum 54 having a plurality of mandrels 55 extending radially outwardly therefrom. Although the drum 54 is shown as having eight mandrels (only five of which may be seen), the precise number is not critical. The central drum 54 and mandrels 55 are similar to the drum 40 disclosed in FIG. 8 in that the mandrels each are provided with a plurality of apertures 24 communicating with a source of vacuum 56 and a source of pressured air 57. Additionally, electric heater means 58 are provided for heating the mandrels 55.

Also mounted on the spindle 51 are a pair of exterior drums 60 positioned on opposite sides of the central drum 54 and carrying thereon eight sets of blow mold halves. Only five of these may be seen. They are designated by the numerals 61a–61b through 65a–65b. Thus there is provided one blow mold for each mandrel. The respective halves 61a–61b through 65a–65b are positioned in alignment with the respective mandrels 55 and are mounted for movement from an open to a closed position and back to an open position. Each of the mold halves is carried on the end of a support member 66 which is slidably carried on a block 67 mounted on the respective drums 60. Spring members 68 are provided to urge the respective mold halves toward an open position. A cam wheel 69 is positioned on the free end of each of the support members 66, and engages a cam 70 mounted on the stationary frame 50. It can be seen from FIG. 9 that rotation of the spindle with the cam wheels 69 riding on the cam 70 causes the respective blow mold halves to move from an open position to a closed position at the blow station and back to an open position at the container ejection station.

In the operation of this embodiment, preforms P are positioned on the mandrels 55 as they move beneath the stationary feed device 42. As soon as the preform P is positioned thereover, vacuum is applied to the mandrel to retain the preform snugly there against. Additionally, heat is also introduced to the mandrel as soon as the preform is positioned thereon. The blow molds are then closed around as illustrated by the closed mold halves 63a–63b and 64a–64b. As soon as the molds are closed and the preform reaches the proper temperature, the vacuum is cut off and pressured air is introduced through the mandrel to expand the heated preform therein. Thereafter, the mold halves are opened as indicated at 65a–65b and the newly formed container C is ejected therefrom to a conveyor 43 for movement to a filling station. Such ejection may be accomplished by physically pushing the container from the mandrel or by continuing to blow air through the mandrel 55.

Figure 10:
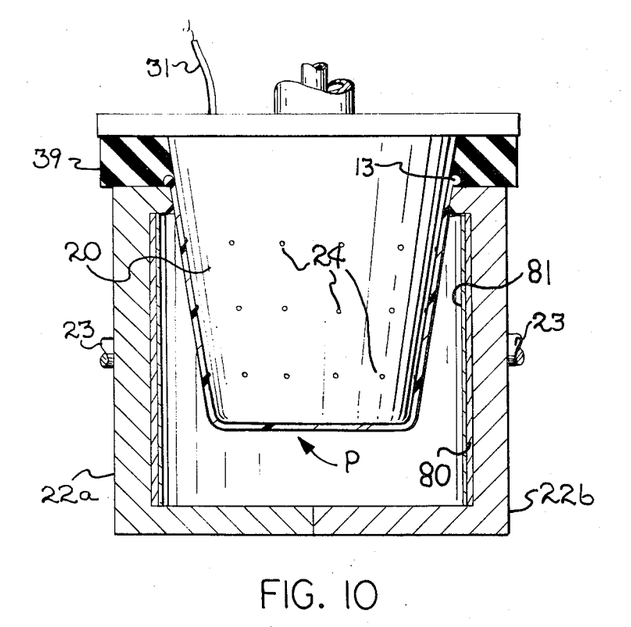
FIGS. 10 and 11 are elevational views, partly in section showing the modification of reforming the preform directly into a sleeve member.
Figure 11:
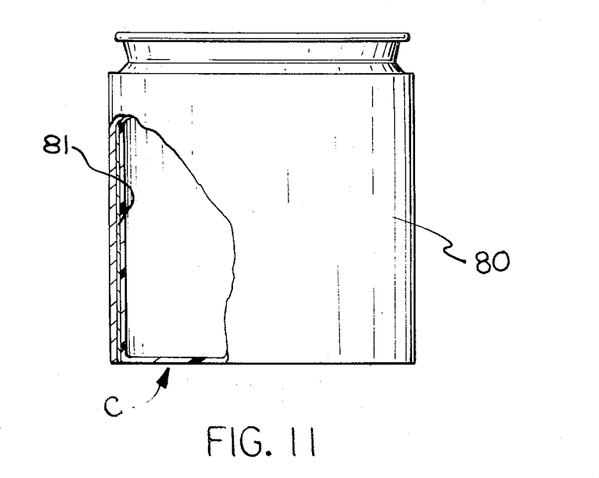

Referring now to FIGS. 10 and 11, there is provided means for expanding a preform P directly into a cylindrical fiberboard sleeve 80.

Under this embodiment, a pair of blow mold halves 22a–22b may be provided as in the previous embodiment and the preform P expanded therein by means of a heated mandrel 20. As such, the fiberboard sleeve 80 is simply positioned within the blow mold 22 prior to closing of the halves and positioning of the mandrel 20 therein. Alternatively, the preform P may, if desired, be expanded directly into the fiberboard sleeve 80, thus using the fiberboard sleeve as the mold with the bottom of the preform P being held in position by a simple plate member. In such case, it is desirable to use rim grippers 32 (as shown in FIGS. 3 through 6) to hold the rim 13 in a fixed position throughout the operation. Thus, the sleeve 80 can either be used in conjunction with a blow mold or it may form the blow mold.

It has been found that after the preform P has been expanded in the fiberboard sleeve, it has a tendency to shrink upon cooling thus leaving areas in which there is no contact between the plastic and the fiberboard sleeve. This is undesirable as it gives the appearance of air bubbles when looking into the container. This is especially true when the preform is formed of polystyrene. This problem may be overcome by providing means for adhering the plastic of the preform to the sleeve 80 upon expansion. As illustrated in FIG. 10, a coating 81 of hot melt adhesive may be utilized for such means. Although many types of adhesive may be used, a compounded mixture of paraffin and ethyl vinyl acetate sold by du Pont under the trade name "Elvax" has been especially effective for adhering the plastic to the fiberboard sleeve 80. The adhering of the plastic to the fiberboard sleeve, in addition to solving the shrinkage problem, results in a laminated container of increased strength.

The sleeve 80 may have any desired configuration, including the cylindrical, frusto-conical or rectangular. The utilization of such fiberboard sleeve may eliminate the necessity of the packer providing a blow mold thereby permitting the formation of the container C from the preform P with a smaller investment in capital equipment.

Figure 12:
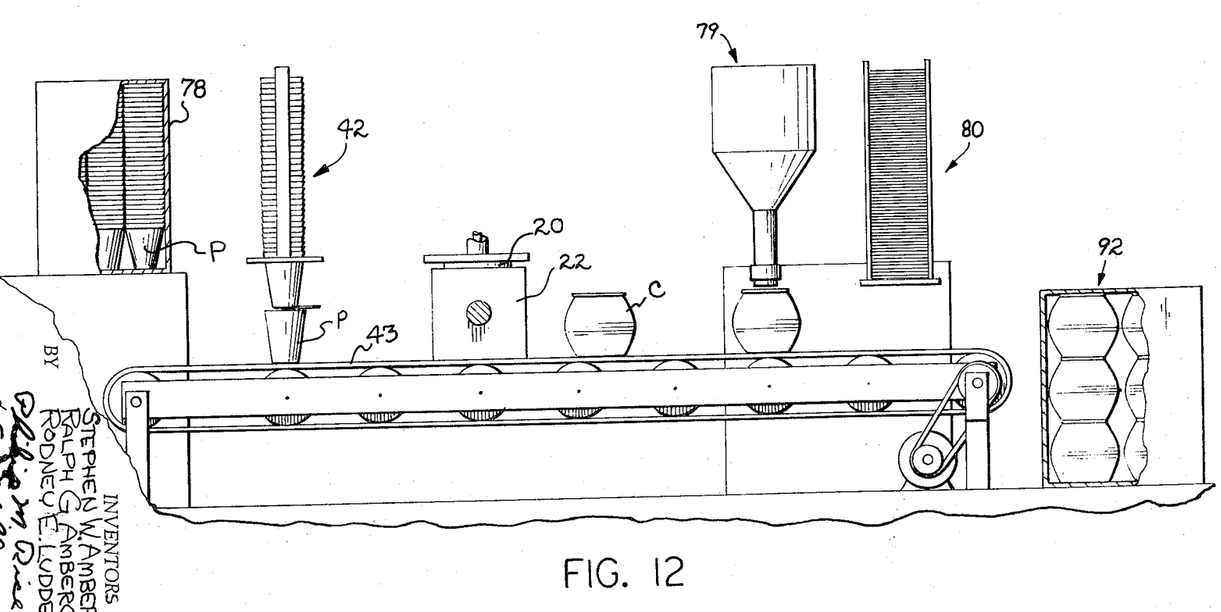
FIG. 12 is a diagrammatic view showing the overall filling system incluouing the reforming apparatus.

Referring now to FIG. 12, there is illustrated diagrammatically an overall system in a packer's plant for storing the preforms P in a nested and stacked configuration and then dispensing such preforms and delivering them to the reshaping mechanism previously described. While awaiting reshaping, the preforms P are compactly stored in a supply receptacle 78. A stack of preforms may be manually fed to the feed device 42 which successively feeds the individual preforms P to the conveyor 43 for delivery to the reshaping station at which the mandrel 20 and blow molds 22 are located. From the reshaping operation, the newly formed and reshaped containers C are delivered to a conventional filler 79 for filling with product and thence to a capper 80 for capping and sealing. Thereafter, the filled and capped containers are conveyed to a packing station 92 where they are placed in cartons for shipment to their customers.

Figure 13:
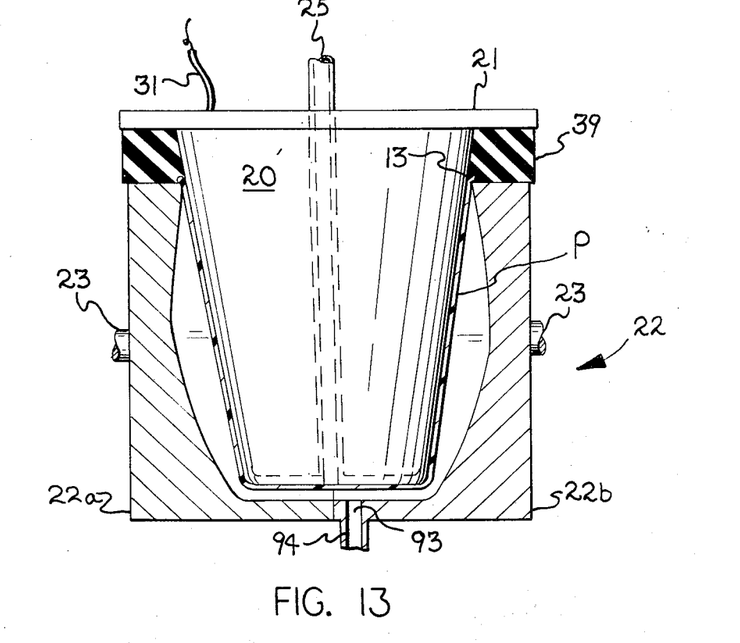
FIGS. 13 through 16 are diagrammatic views showing modified apparatus.

Referring now to FIG. 13, a further modification is shown in which the pressure differential for retaining all surface portions snugly against the mandrel during the heating step is caused by the introduction of pressured air into the closed mold and around the preform P rather than by vacuum applied internally as in the previous embodiment. Under the present embodiment, one of the mold halves 22b is provided with an aperture 93 which communicates with an air line 94 connected to a source of pressured air. During the heating step, pressured air is introduced through the line 94 and aperture 93 into the molding cavity defined by the closed blow mold halves. The pressure differential between the outside of the preform P and the interior thereof caused by the pressured air is such as to urge the parison snugly against the mandrel and thus serves to retain all surface portions of the preform in substantially their original location. As can be seen from FIG. 13, the mandrel 20' under this embodiment may be formed with a smooth sidewall portion. Additionally, it may be seen that it is not necessary that the vacuum line shown in the previous embodiments be utilized in the present embodiment although it could be used if desired. Rather, under the present embodiment, the air line 25 simply extends to an aperture 24 in the end face of the mandrel. Upon completion of heating the preform P to the required temperature for expanding, the air from the line 94 is simply shut off and pressured air is introduced through the line 25 and aperture 24 to expand the preform P in the closed mold 22.

It will be appreciated that the method of retaining the preform snugly against the mandrel as set forth in this embodiment can be utilized in the embodiments of FIGS. 8–10.

It will be readily appreciated from the foregoing that the present invention provides advantages which will have great benefit both to the packer and to the manufacturer of the nestable preform and will provide cost savings to both. It will permit both the manufacturer and the packer to utilize a minimum inventory of preformed shapes. From the standpoint of the packer, it was previously necessary for him to have a sufficient stockpile of empty containers to permit his filling lines to operate at optimum capacity. If such packer elected to package various of his products in different and distinctively shaped containers, it was necessary that he have a separate inventory for each such configuration. By utilizing the present invention, the packer can effectively reduce his supply in inventory to a few standard shapes since each shape is adaptable to be reformed into a plurality of configurations. The customer may continue to package his goods in distinctively shaped containers simply by changing the mold in which he reforms the preform.

Figure 14:
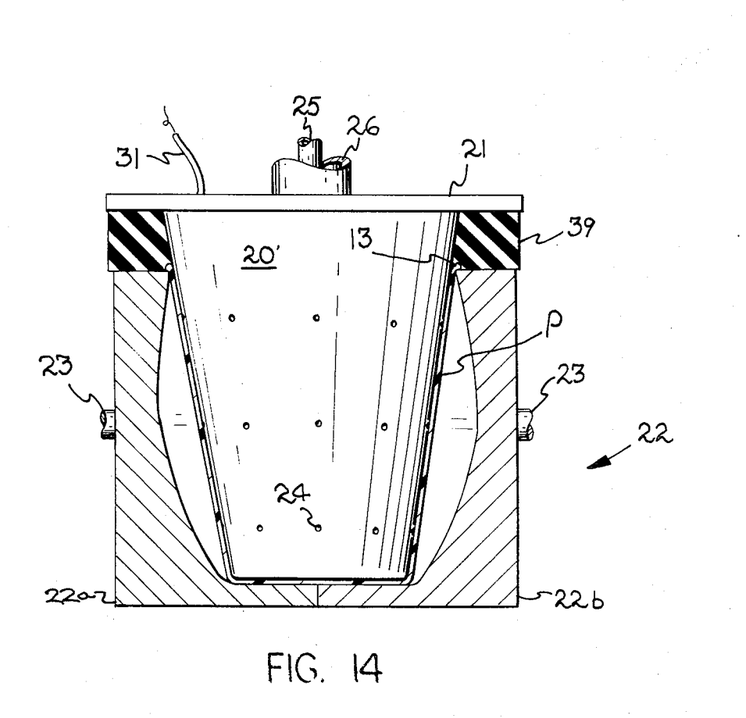

The change in configuration from the preform P to the finished container C may result from expanding the preform both radially and axially as illustrated in FIGS. 3–6 or only radially as shown in FIG. 4 where there is illustrated schematically a closed blow mold 22 with a preform P positioned therein. As can be seen from FIG. 14, the axial length of the preform P is the same as the axial length of the cavity defining the configuration of the expanded container. Additionally, in the example of FIG. 14, the diameter of the end wall of the preform P is the same as the diameter of the end wall of the finished container C.

Figure 15:
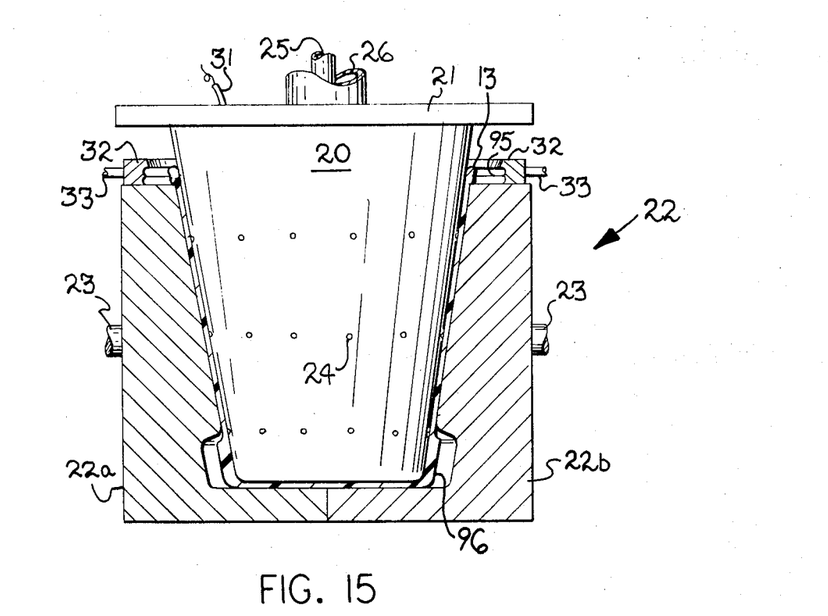
Figure 16:
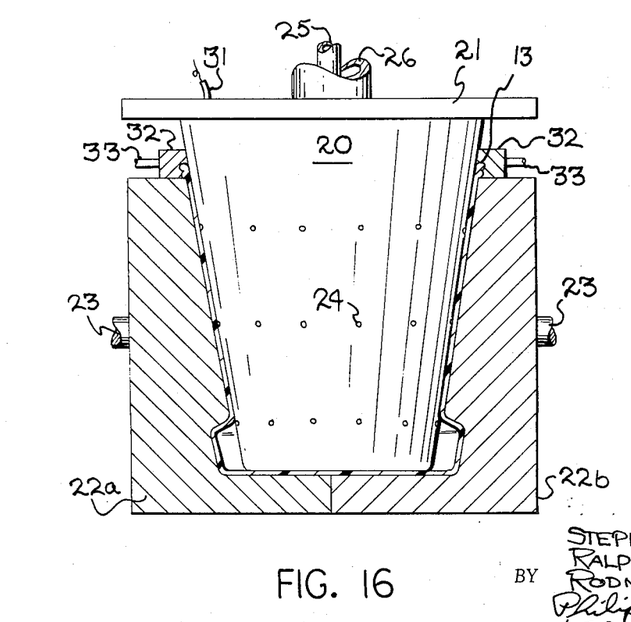

In FIGS. 15 and 16, there is shown an embodiment in which the major portion of the preform sidewall retains its original configuration with only the lower portion of the sidewall and the end wall configuration being changed upon expansion in the mold. Additionally, as may be seen from a comparison of FIGS. 15 and 16, it is possible to provide the neck rings 32 with a threaded portion 95 and thereby mold threads in the rim 13 so that the finished container can be sealed by a threaded closure. If desired, the portion 96 of the preform to be subjected to the expansion may be provided with a greater wall thickness than other areas of the preform.

The present invention will also permit the packer to have a custom made finished package for each item regardless of whether it is a large or small volume item. In the past, the packers have been limited somewhat in the flexibility to use distinctively shaped containers for each product because it simply was not economical to tool up for those items having only a small volume. This is due to the fact that a container manufacturer simply cannot accept an order for a particular item unless a predetermined minimum volume is expected. However, it is contemplated that a packer could readily have built a single mold and utilize it for reforming containers even where only a very small volume is anticipated.

One additional advantage is that a preform P of a given size and shape may be utilized to form a container C having not only an unlimited number of shapes but also an unlimited volume. Thus, for example, some products are sold by liquid measure by volume and others are sold by weight. In the past, packers have purchased liquid measure containers and found that they were not suitable for products to be sold by weight. Such containers could not be modified even by a small amount to accommodate them for a weight measured product. By being able to reform the container on his own premises, the packer is able to tailor the container for the exact product to be packaged therein. Furthermore, it is possible to obtain a sterilized container as a result of heating the preform P. This is especially true where the preform P is heated to a temperature on the order of 300° F.

The advantages to the container manufacturer are in large measure similar to the advantages of the packer. Particularly significant is the reduction in warehouse space that is required since it permits a reduction in the inventory of different sizes and shapes of containers from that previously required. Additionally, the present invention permits a reduction in the tooling inventory for the container manufacturer since the final shape of the container is obtained by the packer. Additionally, the present invention reduces scheduling problems by reducing the numbers of shapes and sizes of containers being formed by the container manufacturer. Previously, it was required to shut down the plastic molding machines in order to change from one size and configuration of article to another. Utilizing the present invention, the container manufacturer will have a minimum down time resulting from tooling changes and will be permitted to utilize extended production runs and benefit from the efficiencies inherent in such extended runs.

The essential benefits accruing to the packer by the use of preprinted preforms have been heretofore explained. The preforms can be printed by the container manufacturer, thus simplifying the reforming process of the packer; the same identifying indicia can be identically printed on all containers for the same product regardless of the size of the ultimate package; cheaper printing techniques (such as offset printing) can be utilized to print the preform surfaces which can be supported internally and which are at least partially formed of straight line elements rather than the more complex and expensive printing techniques necessary to print the irregular and variable surfaces of the final blown container which may be oblate in form and none of the elements of which are straight lines; and the packer can form unique, custom containers without running an expensive, complex printing operation.

We claim:

1. The method of forming plastic containers comprising the steps of thermoforming a plurality of nestable preforms from thermoplastic sheet material, each preform having a bottom and a sidewall tapering upwardly and outwardly therefrom to an open mouth rim portion, transporting said preforms in nested condition to a remote packaging site, denesting said preforms, mounting each denested preform on a mandrel having exterior surface configuration corresponding substantially to the configuration of the interior of said preform sidewall and bottom portions and, while each is so mounted, mechanically gripping the preform by its said mouth rim portion and applying vacuum through each of a plurality of small apertures formed in said mandrel to hold the preform in its said mounted position, heating the preform to a temperature at which it is readily deformable and placing an enlarged molding cavity in surrounding relation therewith, said molding cavity having interior configuration corresponding to the exterior configuration of the body of said container, and applying fluid pressure through said mandrel apertures to expand the heated preform to the shape of said molding cavity.

2. The method according to claim 1 wherein closure threads are press-molded on said mouth rim portion of each said preform contemporaneously with said gripping of the preform by its said mouth rim portion.

3. The method according to claim 1 wherein said mounting of the preform on said mandrel comprises introducing air under pressure into said molding cavity when in its said surrounding relation to press said preform against said mandrel.

4. The method of forming a plastic article comprising thermoforming a nestable preform from thermoplastic sheet material, said preform having a bottom portion and a sidewall portion tapering upwardly and outwardly therefrom and terminating at its upper end in a rim portion, said preform being nestable with other identical preforms, positioning said preform on a mandrel having a configuration corresponding substantially to the configuration of the interior of said preform sidewall and bottom portions, positioning said mandrel and preform in a mold having an enlarged cavity corresponding in configuration to that of said article, holding said preform on said mandrel and heating said preform to a temperature at which it is readily deformable, said holding of the preform on the mandrel comprising applying a vacuum only on the interior surface of said bottom portion of the preform and introducing air under pressure into said mold to press said preform against said mandrel, and then creating a pressure differential on opposite sides of said preform acting to expand said preform into conformity with said mold cavity, said creating of a pressure differential to expand said preform comprising applying air pressure only to said interior surface of the bottom portion of said preform.

5. In a method of producing a blown plastic article having a sidewall portion having printed indicia applied in a pattern, the steps of thermoforming a preform from thermoplastic sheet material, said preform being nestable with other identical preforms and having substantially smaller size than said article and having an open mouth rim portion, and a sidewall portion bearing said indicia to appear on the blown article, but in reduced size, mounting said preform on a mandrel having exterior surface configuration corresponding substantially to the configuration of the interior of said preform and, while so mounted, mechanically gripping the preform by its said mouth rim portion and applying vacuum through each of a plurality of small apertures formed in said mandrel to hold the preform in its said mounted position, heating the preform to a temperature at which it is readily deformable, and applying fluid pressure through said mandrel apertures to expand the heated preform to the shape of said article, the printed indicia also expanding with said sidewall portion to provide said pattern of the indicia.

References Cited

UNITED STATES PATENTS

| | | | |
|---|---|---|---|
| 2,315,478 | 3/1943 | Parkhurst | 264—Dig. 33 |
| 2,348,738 | 5/1944 | Hofmann | 264—94 |
| 2,891,280 | 6/1959 | Politis | 264—94 |
| 2,953,814 | 9/1960 | Mumford | 264—163 X |
| 3,011,216 | 12/1961 | Gussoni | 264—97 UX |
| 3,259,942 | 7/1966 | Politis | 264—94 UX |
| 3,283,046 | 11/1966 | DeWitt et al. | 264—94 X |
| 3,305,158 | 2/1967 | Whiteford | 229—25 |

FOREIGN PATENTS

| | | |
|---|---|---|
| 684,069 | 4/1964 | Canada. |
| 981,640 | 1/1965 | Great Britain. |
| 1,060,249 | 3/1967 | Great Britain. |
| 1,344,611 | 10/1963 | France. |

OTHER REFERENCES

K. J. Cleereman, W. J. Schrenk and L. S. Thomas, "Bottle Blowing Using Multiaxially Oriented Injection Molded Parisons," SPE Journal, July 1968, vol. 24, pp. 27–31.

R. F. McTier, "Distertion Printing and Vacuum Forming of Thermoplastic Sheet," SPE Journal, July 1962, pp. 741–745.

ROBERT F. WHITE, Primary Examiner

J. H. SILBAUGH, Assistant Examiner

U.S. Cl. X.R.

264—92, 94, 97, 132; 425—388